US012719159B2

(12) United States Patent
Nair et al.

(10) Patent No.: US 12,719,159 B2
(45) Date of Patent: Aug. 25, 2026

(54) ANTENNA ARRAY COMPRISING HORN ARRAY ELEMENTS

(71) Applicant: Cambium Networks Ltd, Ashburton (GB)

(72) Inventors: Deepu Vasudevan Nair, Bangalore (IN); Tamilarasan S R, Bangalore (IN); Tirth Arun Bahamaniya, Bangalore (IN); Varun Hegde, Bangalore (IN)

(73) Assignee: Cambium Networks Ltd, Ashburton (GB)

( * ) Notice: Subject to any disclaimer, the term of this patent is extended or adjusted under 35 U.S.C. 154(b) by 38 days.

(21) Appl. No.: 19/013,175

(22) Filed: Jan. 8, 2025

(65) Prior Publication Data

US 2025/0286286 A1 Sep. 11, 2025

(30) Foreign Application Priority Data

Mar. 6, 2024 (IN) ............................ 202441015943

(51) Int. Cl.
*H01Q 1/52* (2006.01)
*H01Q 9/04* (2006.01)
(Continued)

(52) U.S. Cl.
CPC ........... *H01Q 1/523* (2013.01); *H01Q 9/0457* (2013.01); *H01Q 13/02* (2013.01); *H01Q 19/10* (2013.01);
(Continued)

(58) Field of Classification Search
CPC .......... H01Q 1/246; H01Q 1/42; H01Q 1/523; H01Q 1/526; H01Q 9/0457; H01Q 13/02;
(Continued)

(56) References Cited

U.S. PATENT DOCUMENTS 6,295,028 B1 * 9/2001 Jonsson ................ H01Q 1/246
343/700 MS
7,212,163 B2 5/2007 Huang et al.
(Continued)

FOREIGN PATENT DOCUMENTS

WO WO0141256 A1 * 6/2011 ............ H01Q 21/08

OTHER PUBLICATIONS

Extended European Search Report for EP Application No. 25 160 396.5 dated Aug. 8, 2025 (7 pp.).
(Continued)

*Primary Examiner* — Robert Karacsony
(74) *Attorney, Agent, or Firm* — Crowell & Moring LLP

(57) ABSTRACT

An antenna array assembly comprises a plurality of horn array elements, each comprising a waveguide horn and a plurality of radiator patches, a planar substrate to which the plurality of horn array elements is attached, the planar substrate having a ground plane comprising a plurality of slots on a first side and a plurality of feed tracks on the second side; and a ground conductor configured as a reflector, the ground conductor being disposed parallel to the planar substrate and behind the planar substrate with respect to the horn array elements. A plurality of conductive members is disposed such that each conductive member is between the ground conductor and a respective horn array element, each conductive member being perpendicular to the ground conductor, and each conductive member being electrically connected to the ground conductor.

17 Claims, 6 Drawing Sheets

(51) Int. Cl.
*H01Q 13/02* (2006.01)
*H01Q 19/10* (2006.01)
*H01Q 21/00* (2006.01)
*H01Q 21/08* (2006.01)

(52) U.S. Cl.
CPC ......... *H01Q 21/0075* (2013.01); *H01Q 21/08* (2013.01)

(58) Field of Classification Search
CPC .. H01Q 19/10; H01Q 21/0006; H01Q 21/064; H01Q 21/0075; H01Q 21/0081
See application file for complete search history.

(56) References Cited

U.S. PATENT DOCUMENTS

2018/0375183 A1* 12/2018 Goto .......................... H01P 3/06
2021/0210855 A1 7/2021 Yue et al.

OTHER PUBLICATIONS

Methfessel, Sebastian et al.: "Design of a balanced-fed patch-excited horn antenna at millimeter-wave frequencies", Antennas and Propagation (EuCap), 2010 Proceedings of the Fourth European Conference on, IEEE, Piscataway, NJ, USA, Apr. 12, 2010 (Apr. 12, 2010), pp. 1-4, XP031705643, ISBN: 978-1-4244-6431-9 (4 pp.).
Shireen, R. et al.: "A high gain patch fed horn antenna for millimeter wave imaging receiver", Spie, PO Box 10, Bellingham, WA 98227-0010 USA, vol. 5989, Dec. 31, 2005, XP040211433, Newark (8 pp.).

* cited by examiner

ANTENNA ARRAY COMPRISING HORN ARRAY ELEMENTS

CROSS-REFERENCE TO RELATED APPLICATION

This application claims priority to India patent application No. 202441015943, filed on Mar. 6, 2024, the entirety of which is hereby fully incorporated by reference herein.

TECHNICAL FIELD

The present disclosure relates generally to an antenna array, and in particular, but not exclusively, to a linear antenna array of horn array elements

BACKGROUND

Modern wireless communication networks are typically placed under great demands to provide high data capacity within the constraints of the allocated signal frequency spectrum. To achieve a high data capacity, it is beneficial to transmit and receive signals with a high signal to noise ratio. To improve signal to noise ratio, increasing use is made of multi-element antenna arrays. Multi-element antenna arrays typically comprise a number of antenna elements, each of which is configured to transmit and/or receive electromagnetic energy at a respective amplitude and phase appropriate to form a radiation beam or beams. Some multi-element antenna arrays have antenna elements each of which is configured to radiate and/or receive at a pre-determined relative amplitude and phase, for example being connected to a transmitter and/or receiver by a feed network of signal tracks having appropriate relative path lengths to provide the required relative phase shifts. Typically each antenna element may be implemented as a patch radiator, dipole, or other radiating device and may be provided with a ground plane.

It would be beneficial to provide a multi-element antenna array with improved radiation characteristics.

SUMMARY

In accordance with a first aspect of the present disclosure there is provided an antenna array assembly comprising: a plurality of horn array elements, each horn array element comprising a waveguide horn and a plurality of radiator patches; a planar substrate to which the plurality of horn array elements is attached, the planar substrate having a ground plane comprising a plurality of slots on a first side, the first side being disposed towards the plurality of horn array elements and comprising a plurality of feed tracks on the second side, each feed track being disposed to cross a respective slot, and each slot corresponding to a respective waveguide horn; a ground conductor configured as a reflector, the ground conductor being disposed parallel to the planar substrate and behind the planar substrate with respect to the horn array elements; and a plurality of conductive members, each conductive member being disposed between the ground conductor and a respective horn array element, each conductive member being perpendicular to the ground conductor, and each conductive member being electrically connected to the ground conductor.

This arrangement provides improved gain, improved front-to-back isolation and improved isolation antenna array elements. In particular, the conductive members perpendicular to the ground conductor disrupt a standing wave in the cavity between the ground conductor and the ground plane. This may improve the front to back ratio, that is to say the ratio between gain in the intended direction of radiation and gain in a direction opposite to the intended direction of radiation, gain in the intended direction, and isolation between polarisations.

In an example, each conductive member is a substantially planar conductive wall. This allows efficient disruption of the standing wave by providing grounded barriers in the cavity.

In an example, the antenna array comprises one or more linear arrays of horn array elements, each linear array having an axis passing through the horn array elements of the linear array, and each wall being perpendicular to the axis of a respective linear array.

In an example, each conductive wall has a width perpendicular to the axis of a linear array of horn array elements of at least half of the width of a horn array element. The width of each conductive wall may substantially 80% of the width of a horn array element next to the substrate. In an example, the height of each wall from the ground conductor is at least 50% of the distance from the ground conductor to the planar substrate. The height of each wall from the ground conductor may be substantially the distance from the ground conductor to the planar substrate. This may provide particularly effective disruption of a standing wave.

In an example, each conductive member is a post. This provides an alternative structure for disrupting a standing wave.

In an example, the antenna array comprises one or more linear arrays of horn array elements, each linear array having an axis passing through the horn array elements of the linear array, and each post being positioned on and perpendicular to an axis parallel to the axis of a linear array. Each post may be substantially cylindrical. In an example, each post is resonant at an operating frequency of the antenna array. Each post may have a height from the ground conductor of at least 50% of the distance from the ground conductor to the planar substrate. This provides for efficient disruption of a standing wave.

In an example each waveguide horn has a rectangular cross-section. This provides effective radiation for dual polarisation patch antenna elements.

In an example, a cross-sectional area of the waveguide horn parallel to the ground conductor is greater at an end of the waveguide horn furthest from the ground conductor than a cross-sectional area of the waveguide horn parallel to the ground conductor at an end of the waveguide horn nearest to the ground conductor. This provides an improved radiation pattern.

In an example, the plurality of feed tracks are enclosed in a cavity at least comprising the ground plane and the ground conductor. This provides an effective means of providing the cavity, which may improve overall gain.

Further features of the present disclosure will be apparent from the following description of preferred embodiments, which are given by way of example only.

DETAILED DESCRIPTION

By way of example, embodiments of the present disclosure will now be described in the context of an antenna assembly array for operation in frequency band in the region of 4-8 GHZ, and in particular 4.9-7.2 GHz, but it will be understood that embodiments of the present disclosure are not restricted to operation in this range, and antenna arrays designed to operate at higher or lower frequencies may also be tested using the claimed method and apparatus.

FIGS. 1-6 show various views and cross-section of an example of an antenna array assembly having a linear array of horn elements. This example is designed to operate in the frequency band 4.9-7.2 GHz, and provides front to back ratio (FBR) of greater than 25 dB and cross polarisation level greater than 15 dB for this frequency band, and provides a peak gain of 17 dBi and an average gain above 15 dBi. An azimuth-6 dB beam width of 120 degrees in both vertical and horizontal polarisation is provided, and an elevation-6 dB beamwidth of 8 degrees in both vertical and horizontal polarisation is provided.

Figure 1:
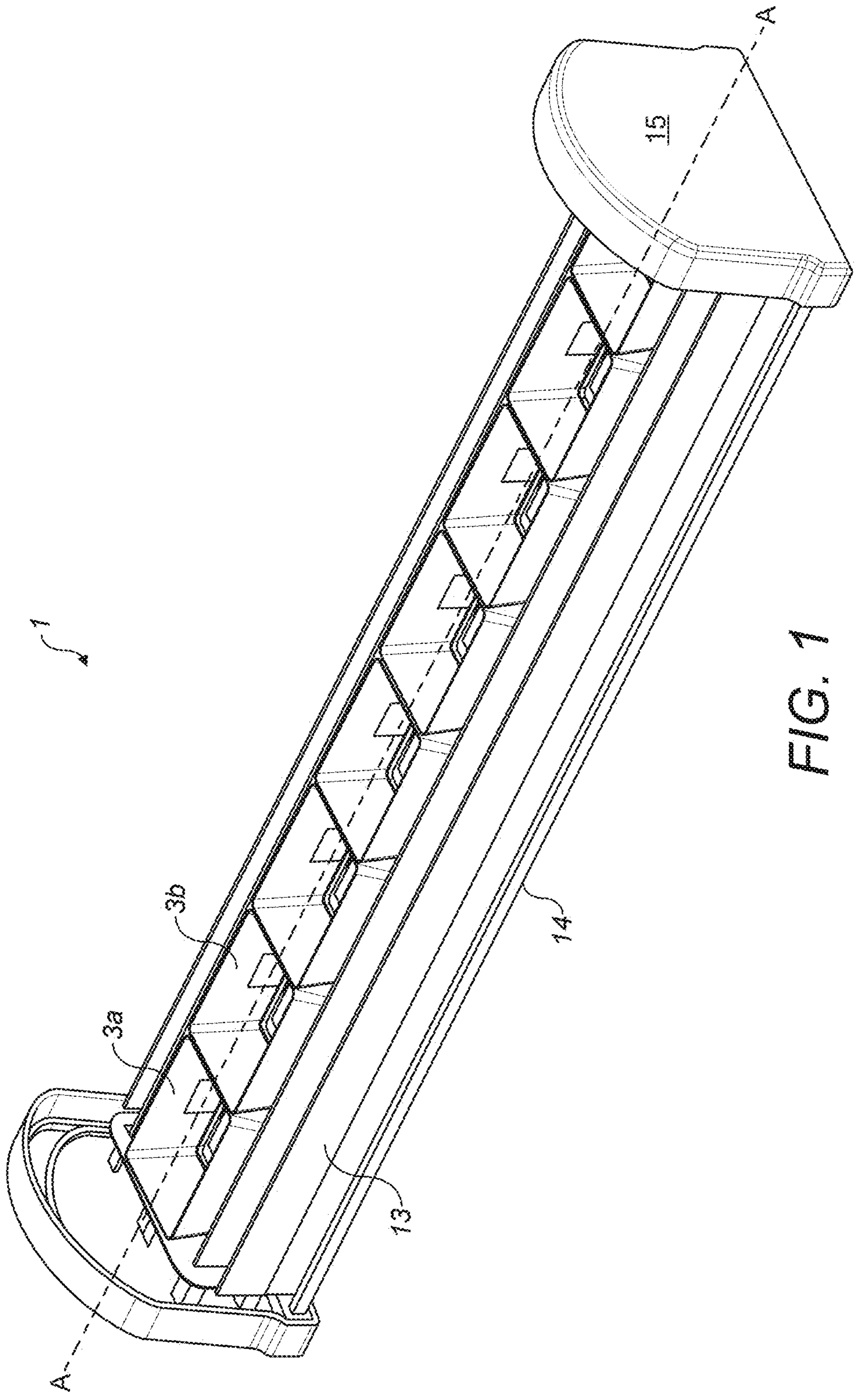
FIG. 1 shows an oblique view of an antenna array assembly having a linear array of horn elements in an example. In this view, the radome is removed.

FIG. 1 shows an oblique view of the antenna array assembly 1 having a linear array of horn elements, each having a waveguide horn 3*a*, 3*b*. The back of the antenna array assembly, opposite from the direction of radiation from the horn array elements, is provided with a ground conductor 14, which may be an aluminium plate. A metallic structure having grounded flanges 13 may be provided at the sides of the antenna array assembly, which may improve the radiation pattern in azimuth, that is to say normal to the axis A-A of the array, which is typically installed in a vertical orientation. End pieces 15 are provided, typically made of a plastic material, to support the radome, which is not shown in this view. A radome is a cover intended to provide environmental protection for the antenna array assembly.

Figure 2:
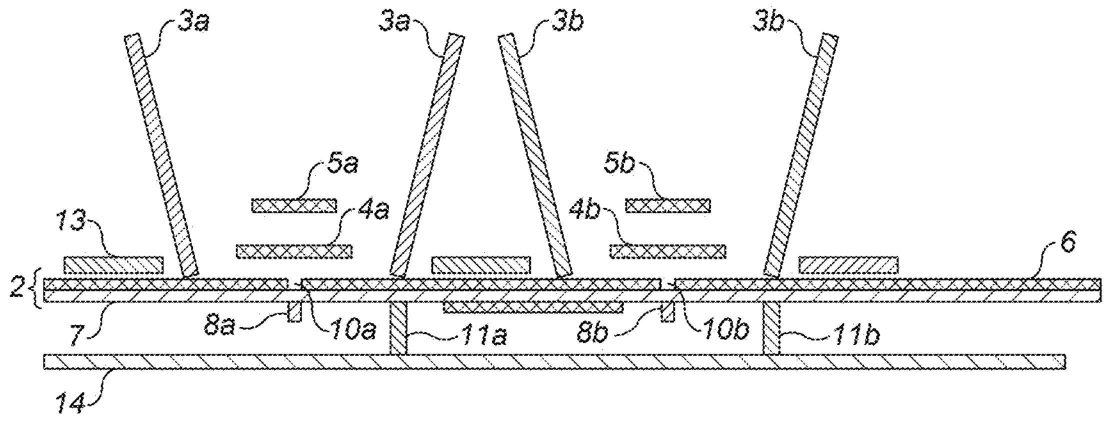
FIG. 2 is a schematic diagram illustrating a cross-section of the antenna array assembly of FIG. 1 along a long axis A-A of the linear array.

FIG. 2 is a schematic diagram illustrating a cross-section of the antenna array assembly of FIG. 1 along a long axis A-A of the linear array. There a plurality of horn array elements, each horn array element comprising a waveguide horn 3*a*, 3*b* and a plurality of radiator patches 4*a*, 5*a*; 4*b*, 5*b*. A planar substrate 7 is provided, typically made of a printed circuit board substrate material, to which the plurality of horn array elements is attached. The planar substrate 7 has a ground plane 6 comprising a plurality of slots 10*a*, 10*b* on a first side, the first side being disposed towards the plurality of horn array elements and comprising a plurality of feed tracks 8*a*, 8*b* on the second side, each feed track 8*a*, 8*b* being disposed to cross a respective slot 10*a*, 10*b*, and each slot corresponding to a respective waveguide horn 3*a*, 3*b*. The planar substrate 7, ground plane 6 and feed tracks 8*a*, 8*b* are typically components of a printed circuit board 2.

A ground conductor 14 is configured as a reflector, the ground conductor 14 being disposed parallel to the planar substrate 7 and behind the planar substrate 7 with respect to the horn array elements 3*a*, 3*b*. A plurality of conductive members 11*a*, 11*b* is provided, each conductive member being disposed between the ground conductor 14 and a respective horn array element, each conductive member 11*a*, 11*b* being perpendicular to the ground conductor 14, and each conductive member 11*a*, 11*b* being electrically connected to the ground conductor. The conductive member in some examples may be a wall, and in other examples may be a post. In the example shown in FIGS. 1, 3 and 5, the conductive member is a wall.

A metallic structure 13 may be provided above the ground plane 6, having grounded flanges as shown in FIG. 1.

Figure 3:
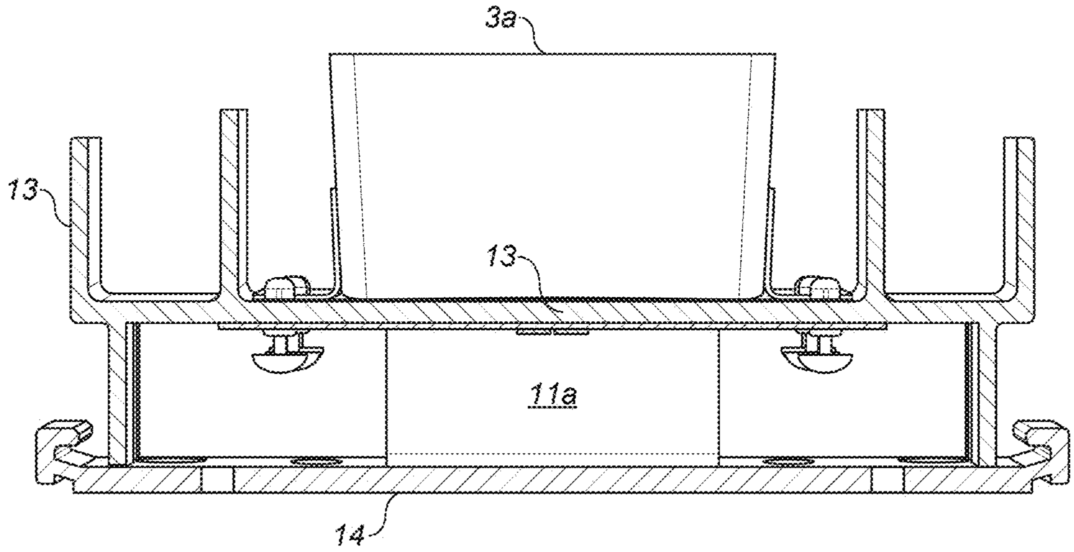
FIG. 3 shows a cross-section view of the antenna array assembly of FIG. 1 across the long axis of the linear array.

FIG. 3 shows a cross-section view of the antenna array assembly of FIG. 1 normal to the long axis of the linear array, showing a waveguide horn 3*a*, a metallic structure 13 having grounded flanges, a ground conductor 14 and a conductive member 11*a* in the form of a wall. The wall is at least 50% of the width of the waveguide horn 3*a* at the end closest to the metallic structure 13, and in this example the width is substantially 80% of the width of the waveguide horn 3*a* at the end closest to the metallic structure 13. The height of the wall is at least 50% of the distance between the ground conductor 14 and the planar substrate, which is below the metallic structure 13, and in this example the height of the wall is substantially the same as the distance between the ground conductor 14 and the planar substrate.

In the case where the conductive member is in the form of a post, which may be substantially cylindrical, the length of the post may be greater than 50% of the distance between the ground conductor 14 and the planar substrate. The post may be resonant at an operating frequency of the antenna array.

Figure 4:
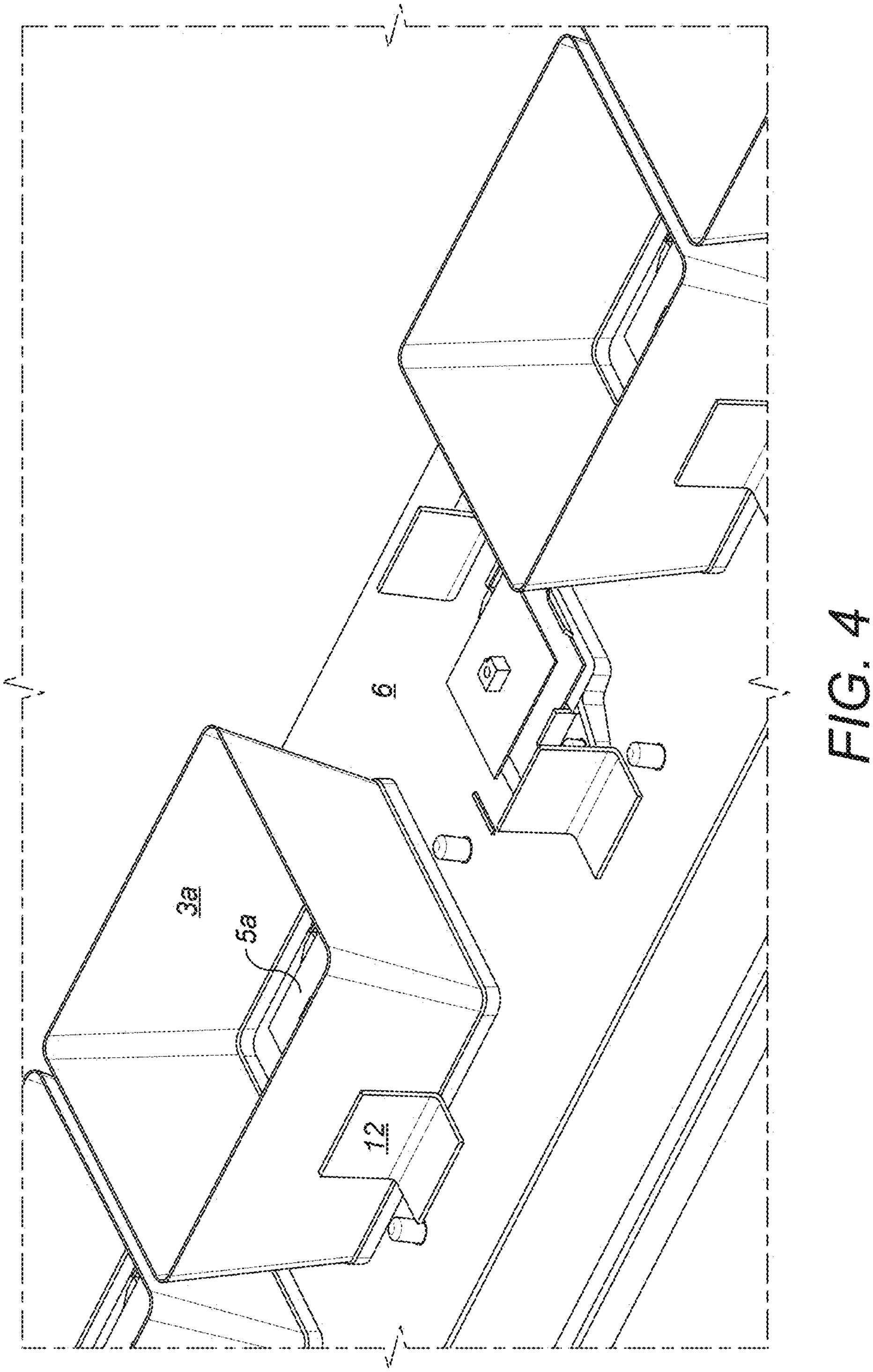
FIG. 4 shows an oblique view of parts of the antenna array of FIG. 1 with a waveguide horn removed to show the radiator patches.

FIG. 4 shows an oblique view of parts of the antenna array of FIG. 1 with a waveguide horn and metallic structure 13 removed to show the radiator patches 5*a* and ground plane 6.

Figure 5:
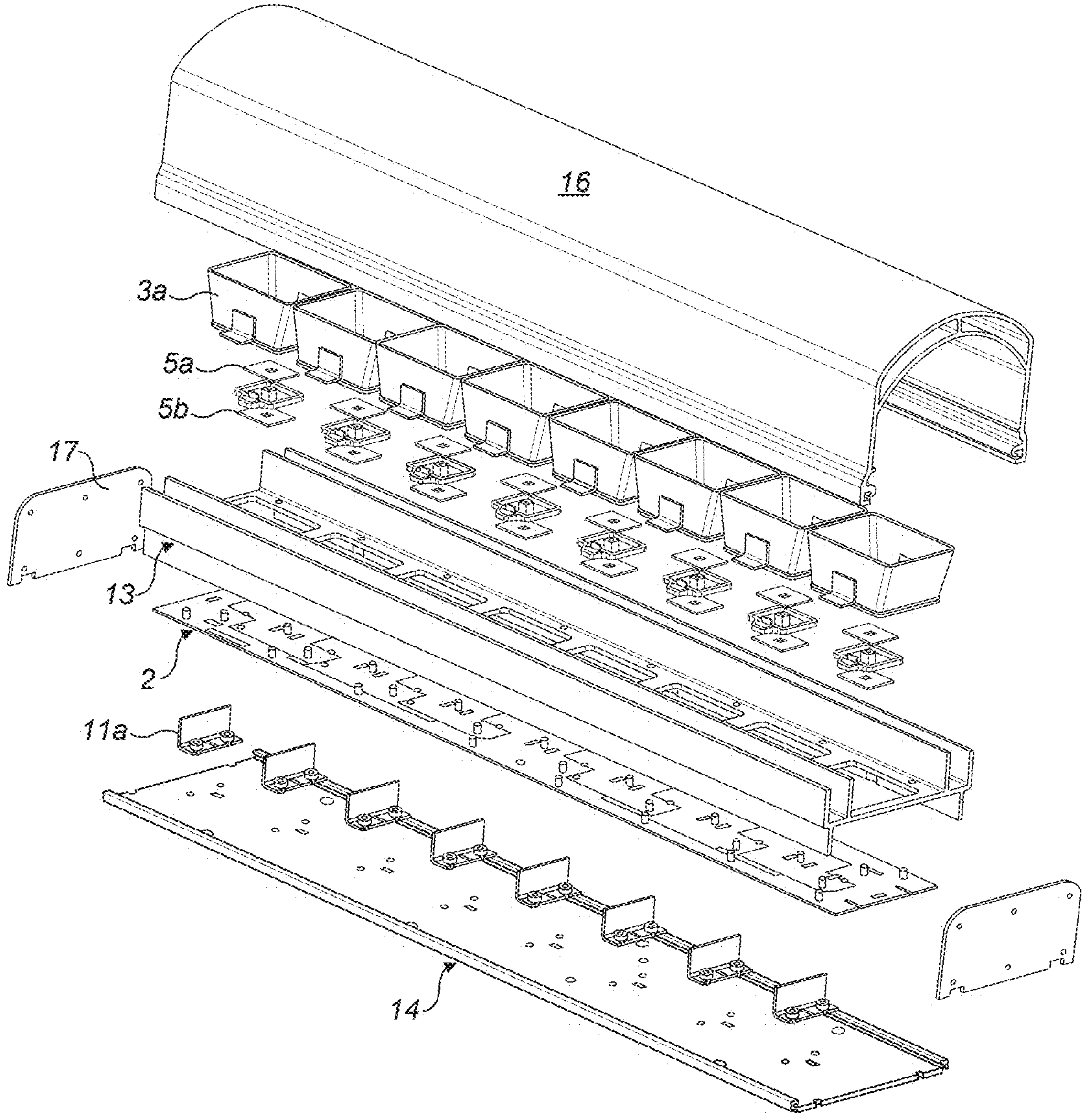
FIG. 5 shows an exploded view of the antenna array assembly of FIG. 1, including the radome.

FIG. 5 shows an exploded view of the antenna array assembly of FIG. 1, including the radome 16. The radome is made of a plastic material such as polycarbonate, that is substantially transparent to radio frequency radiation, which provides environmental protection for the antenna array assembly. FIG. 5 shows the plurality of horn array elements, each horn array element comprising a waveguide horn 3*a* and a plurality of radiator patches 4*a*, 5*a*. Also shown is the metallic structure 13 having a plurality of grounded flanges 13, the printed circuit board 2, the ground conductor 14 and the conductive members 11*a* perpendicular the ground conductor. Also shown are end plates 17, which are typically metallic, and close the ends of the cavity formed by the ground conductor 14, the ground plane of the printed circuit board 2, and the sides of the metallic structure 13.

Figure 6:
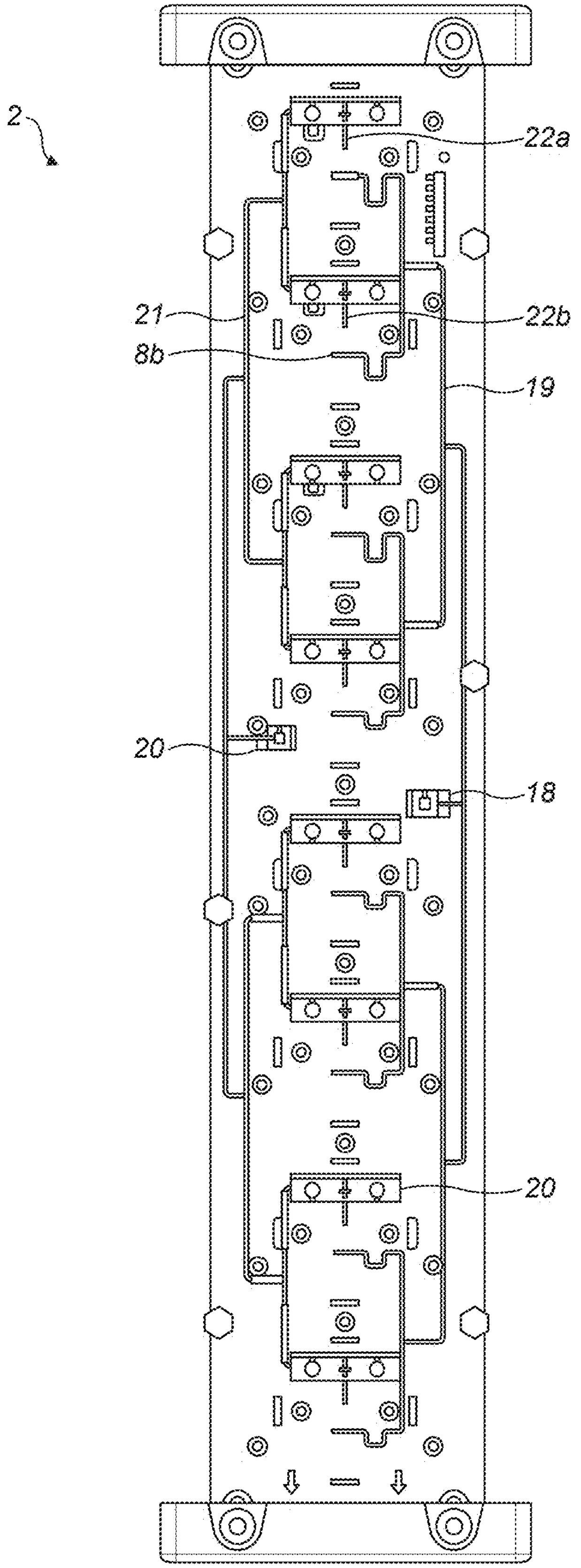
FIG. 6 shows a printed circuit board comprising a planar substrate on which a plurality of feed tracks is printed.

FIG. 6 shows a printed circuit board 2 comprising a planar substrate on which a plurality of feed tracks is printed. Feed points 18, 20 are provided for connections to a radio transceiver for radiation/reception at each of two polarisations, nominally vertical and horizontal. Feed networks 19, 21 are provided to distribute the signals from the feed points to probes 22*a*, 22*b* which couple through apertures in the ground plane 6 (not shown) to the patch radiators 4*a*, 4*b*. The feed networks 19, 20, contained within the printed circuit board 2, avoid the need for additional feeding mechanisms outside the printed circuit board, providing an economical and reliable implementation.

Brackets 20 are provided for fixing the waveguide horns to the printed circuit board 2.

Figure 7:
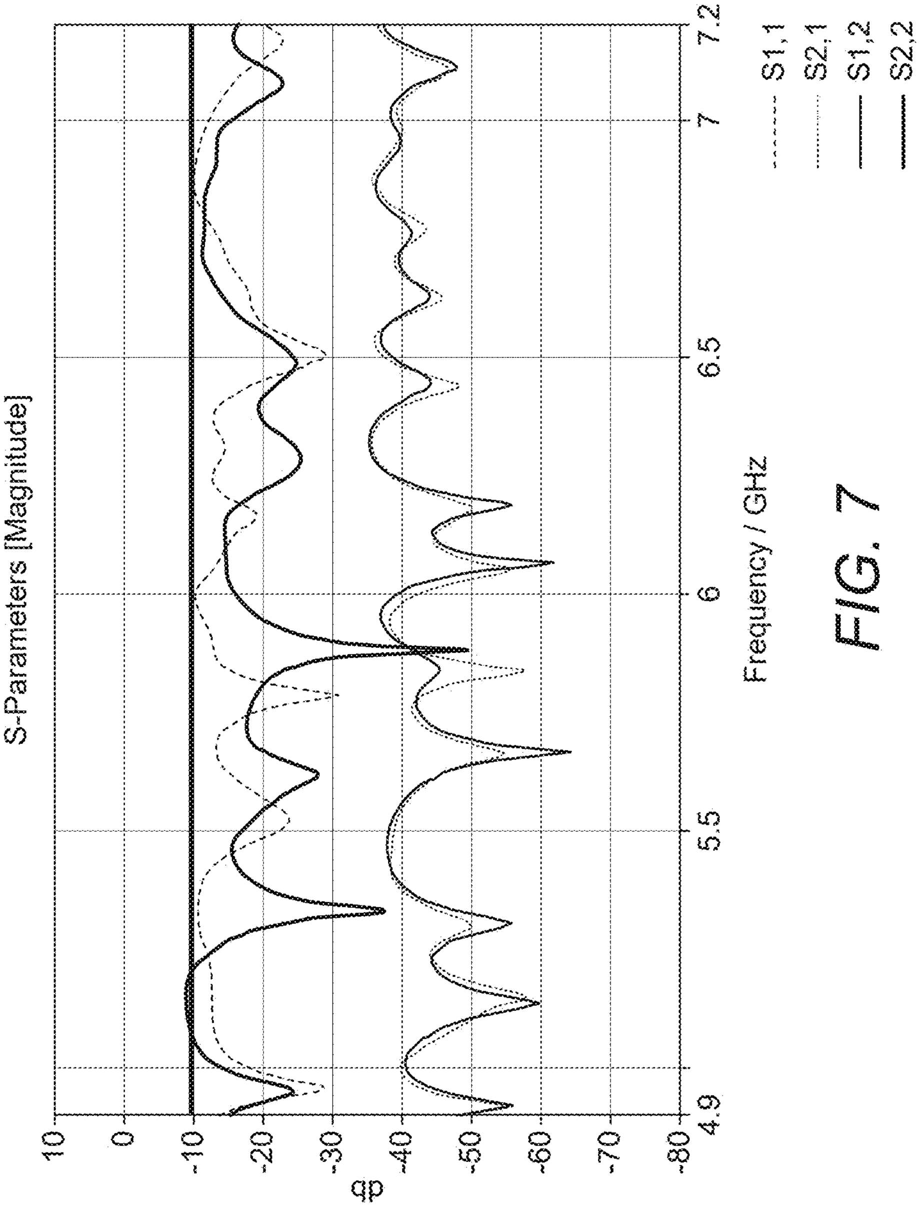
FIG. 7 shows s-parameter measurements for the dual polarised antenna array of FIG. 1, showing return loss (S11 and S22) and isolation (S21 and S12 between vertical and horizontal polarisation feeds).

FIG. 7 shows s-parameter measurements for the antenna array of FIG. 1, showing return loss (S11 and S22) and isolation (S21 and S12). The S21 and S12 measurements represent port to port isolation of the dual polarized horn array. Port 1 is vertical polarization and port 2 is horizontal polarisation.

In an example, a horn array element resonates at the design frequency of 4.9 GHZ to 7.2 GHz. Each horn array element has two radiating patches, one at the top 5*a* and one at the bottom 5*b* with the dimension of 14×15 mm on the top patch and 17×18 mm on the bottom patch. The separation between radiating patch has air as a dielectric medium and the patches are supported by a holder of PTFE material. The radiating element is fed with an aperture coupled feed. The aperture coupled feed has two orthogonal coupling slots on the top layer of the printed circuit board 2 and V and H feeder network (for transmission at vertical and horizontal polarisation respectively) on the bottom layer of the printed circuit board 2.

The antenna array assembly has a reflector 14 on the bottom plane to enhance the gain and supress radiation from the back of the assembly, that is to say to enhance the FBR. It may have a dual skinned radome 16 with permittivity of 3.2 and dielectric loss of 0.008.

In an example, the horn array consists of eight elements with spacing of 2, that is to say the wavelength at on operating frequency of the antenna array assembly, and centre frequency at 6 GHz. The amplitude and phase of the array may be configured to provide a beam pointing towards a 2° elevation angle.

In an example, a Rogers RT/duroid 5880 substrate with a thickness of 0.5 mm, loss tangent of 0.003, and dielectric constant of 2.2 is used for the feeder network.

The technique of cavity reflection, provided by the cavity between the ground conductor 14 and the ground plane 6 of the printed circuit board 2 is used in the array to improve the overall gain. This will improve the FBR, but this inherently has a cavity resonance, in this example at 6.2 GHz. The cavity resonance results in standing waves forming where energy does not propagate but oscillates and cancels out. Additionally, the resonance provides a secondary undesired coupling path across the cavity and affect the cross polar ration, that is to say the isolation between the vertical and horizontal polarisation feed, and the isolation between elements. To reduce the formation of standing waves, conductive members 11*a*, 11*b*, for example posts or walls are provided to disrupt the standing wave. This improves FBR, gain and isolation at the cavity resonant frequency. In an example, the antiresonance wall 11*a* may connect with the one side of the waveguide horn 3*a*.

The above embodiments are to be understood as illustrative examples of the present disclosure. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims.

What we claim is:

1. An antenna array assembly comprising:

a plurality of horn array elements, each horn array element comprising a waveguide horn and a plurality of radiator patches;

a planar substrate to which the plurality of horn array elements is attached, the planar substrate having a ground plane comprising a plurality of slots on a first side, the first side being disposed towards the plurality of horn array elements and comprising a plurality of feed tracks on a second side, each feed track being disposed to cross a respective slot, and each slot corresponding to a respective waveguide horn;

a ground conductor configured as a reflector, the ground conductor being disposed parallel to the planar substrate and behind the planar substrate with respect to the horn array elements; and a plurality of conductive members, each conductive member being disposed between the ground conductor and a respective horn array element, each conductive member being perpendicular to the ground conductor, and each conductive member being electrically connected to the ground conductor.

2. The antenna array assembly of claim 1, wherein each conductive member is a substantially planar conductive wall.

3. The antenna array assembly of claim 2, wherein the antenna array comprises one or more linear arrays of horn array elements, each linear array having an axis passing through the horn array elements of the linear array, and each wall being perpendicular to the axis of a respective linear array.

4. The antenna array assembly of claim 3, wherein each conductive wall has a width perpendicular to the axis of a linear array of horn array elements of at least half of the width of a horn array element.

5. The antenna array assembly of claim 3, wherein a width of each conductive wall is substantially 80% of a width of a horn array element next to the substrate.

6. The antenna array assembly of claim 3, wherein a height of each wall from the ground conductor is at least 50% of a distance from the ground conductor to the planar substrate.

7. The antenna array assembly of claim 3, wherein a height of each wall from the ground conductor is substantially a distance from the ground conductor to the planar substrate.

8. The antenna array assembly of claim 1, wherein each conductive member is a post.

9. The antenna array assembly of claim 8, wherein the antenna array comprises one or more linear arrays of horn array elements, each linear array having an axis passing through the horn array elements of the linear array, and each post being positioned on and perpendicular to an axis parallel to the axis of a linear array.

10. The antenna array assembly of claim 9, wherein each post is substantially cylindrical.

11. The antenna array assembly of claim 8, wherein each post is resonant at an operating frequency of the antenna array.

12. The antenna array assembly of claim 8, wherein each post has a height from the ground conductor of at least 50% of a distance from the ground conductor to the planar substrate.

13. The antenna array assembly of claim 1, wherein each waveguide horn has a rectangular cross-section.

14. The antenna array assembly of claim 12, wherein a cross-sectional area of the waveguide horn parallel to the ground conductor is greater at an end of the waveguide horn furthest from the ground conductor than a cross-sectional area of the waveguide horn parallel to the ground conductor at an end of the waveguide horn nearest to the ground conductor.

15. The antenna array assembly of claim 1, wherein the plurality of feed tracks are enclosed in a cavity at least comprising the ground plane and the ground conductor.

16. The antenna array assembly of claim 1, comprising:

a respective feed network for each of two polarisations connecting a feed point for the respective polarisation to a feed track for the respective polarisation for each horn array element, the feed network comprising an arrangement of tracks on the planar substrate.

17. The antenna array assembly of claim 16, wherein the feed network does not comprise any components outside a printed circuit board comprising the planar substrate and the feed network.

* * * * *